(12) United States Patent
Dufour et al.

(10) Patent No.: US 12,248,525 B1
(45) Date of Patent: Mar. 11, 2025

(54) SEMANTIC-AWARE NEXT BEST ACTION RECOMMENDATION

(71) Applicant: Microsoft Technology Licensing, LLC, Redmond, WA (US)

(72) Inventors: Guillaume Didier Jean-Marc Dufour, Petaluma, CA (US); Yang Chen, Sunnyvale, CA (US); Lukasz Janusz Karolewski, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/243,883

(22) Filed: Sep. 8, 2023

(51) Int. Cl.
*G06F 16/00* (2019.01)
*G06F 16/9032* (2019.01)
*G06F 16/9535* (2019.01)
*G06F 40/30* (2020.01)

(52) U.S. Cl.
CPC .... *G06F 16/9535* (2019.01); *G06F 16/90332* (2019.01); *G06F 40/30* (2020.01)

(58) Field of Classification Search
CPC ............ G06F 16/9535; G06F 16/90332
USPC .................................................. 707/706
See application file for complete search history.

(56) References Cited

U.S. PATENT DOCUMENTS

2022/0277031 A1    9/2022  Quamar
2023/0162058 A1*   5/2023  Kumar ............... G06N 5/04
                                                706/50

OTHER PUBLICATIONS

International Search Report and Written Opinion recieved for PCT Application No. PCT/US2024/043315, mailed on Dec. 17, 2024, 16 pages.

* cited by examiner

*Primary Examiner* — Chelcie L Daye
(74) *Attorney, Agent, or Firm* — KDW FIRM PLLC

(57) ABSTRACT

In an example embodiment, an embedding model is used to generate an embedding of a natural language searching goal specified by a user, the embedding representing user intent of the user. Playbooks in a database of playbooks are also run through the embedding model to generate an embedding for each playbook indicative of a meaning of each playbook. A semantic relationship score can then be computed for each combination of the natural language search goal and a playbook, using the embeddings. These semantic relationship scores can then be passed into a ranking machine learning model, along with measured success rates for the playbooks, to generate a ranking of the playbooks. Based on this ranking, a set of filters and action corresponding to at least one of the playbooks may then be recommended to the user.

20 Claims, 8 Drawing Sheets

SEMANTIC-AWARE NEXT BEST ACTION RECOMMENDATION

TECHNICAL FIELD

The present disclosure generally relates to technical problems encountered in online searches. More specifically, the present disclosure relates to generation and display of semantic-aware next best user interface action recommendation.

BACKGROUND

The rise of the Internet has occasioned two disparate yet related phenomena: the increase in the presence of online networks, such as social networking services, with their corresponding user profiles and posts visible to large numbers of people; and the increase in the use of such online networks for various forms of communications.

BRIEF DESCRIPTION OF THE DRAWINGS

Some embodiments of the technology are illustrated, by way of example and not limitation, in the figures of the accompanying drawings.

FIGS. 4-6 are diagrams illustrating a user interface, in accordance with an example embodiment.

DETAILED DESCRIPTION

Overview

Figure 1:
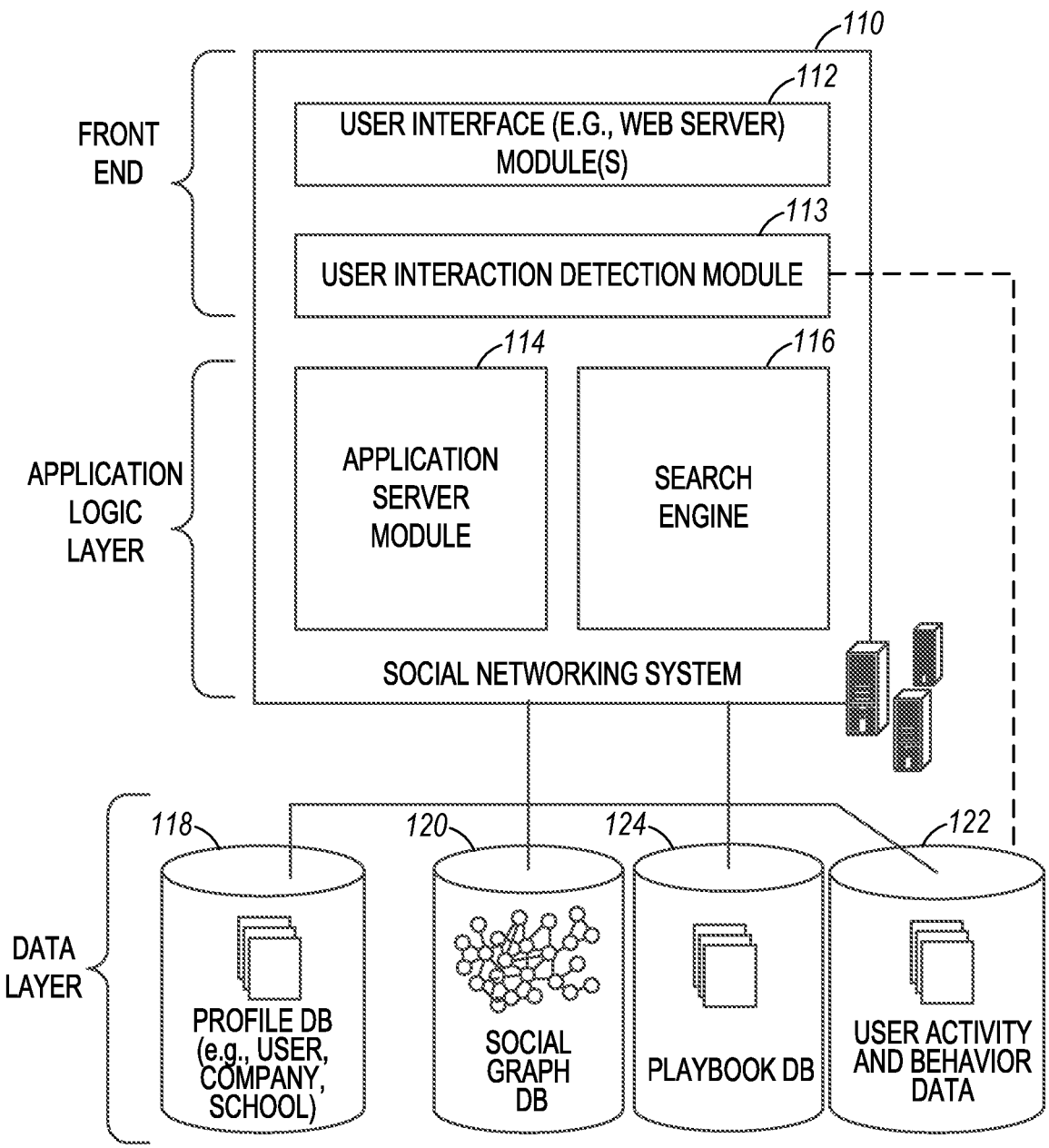
FIG. 1 is a block diagram showing the functional components of a social networking service, including a data processing module referred to herein as a search engine, for use in generating and providing search results for a search query, consistent with some embodiments of the present disclosure.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

One common activity undertaken using the Internet is to perform online searches. Typically, these searches involve specifying one or more filter criteria, sometimes in the form of keywords and/or facet selections, to narrow down search results. In order to conduct effective searching, the user may need to be a domain expert in order to generate filters. What would be helpful is a system that could provide guidance as to searches or search actions to perform.

Certain classes of users often use playbooks, either formally or informally, in specifying these filter criteria. A playbook is a collection of specific filter criteria that is believed to work well in a certain context (e.g., in response to a certain type of event having occurred). In one example, a salesperson may utilize a playbook to indicate which filters to apply to a search in response to a new employee having joined a client company. These filters may specify a narrowing of possible actions to take by the salesperson with respect to contacting the new employee.

Filters, especially filters directly provided by a user, however, often result in search results that do not meet the needs of users. One reason for this is because users often are unaware of the actual filters that can be generated that would produce the optimum results for their goals. Furthermore, a large part of performing searching for search results involves viewing results and then refining a previously provided search query or filters to obtain new results, in an iterative fashion. Users, however, often are unaware of how best to refine a previously provided search query or even what alternative search queries or directions would be likely to succeed at each iteration of the iterative process.

Automatically generating suggested next actions for a user at each iteration would be desirable, but is difficult at the technological level as any machine learning model used for the task would need to have some way to analyze all the different possible actions the user could take at each iteration, and additionally making such recommendations necessitates the model having some level of understanding of the goals of the user.

In an example embodiment, an embedding model is used to generate an embedding of a natural language searching goal specified by a user, with the embedding representing user intent. Playbooks in a database of playbooks are also run through the embedding model to generate an embedding for each playbook indicative of a meaning of each playbook. Using the embeddings, a semantic relationship score can then be computed for each combination of the natural language search goal and a playbook. These semantic relationship scores can then be passed into a ranking machine learning model, along with measured success rates for the playbooks, to generate a ranking of the playbooks. Based on this ranking, a set of filters and actions corresponding to at least one of the playbooks may then be recommended to the user. The action at the top of the ranking may be known as a "next best action" for a search session.

Along with this recommended next best action, the natural language searching goal may be converted into a searching criteria that can be used to identify matching search results in a data set of content, and these matching search results may be presented to the user with the recommended next best action (along with, optionally, other possible actions, such as ones that are not top in the ranking). The user may then select one or more of these actions, and the selected action may be used to further filter the search results and be fed back into the embedding model loop to generate additional embedding used to identify additional recommended action(s) to further filter the search results. Thus, machine learning is able to guide a user to better search outcomes while simultaneously teaching the user search tactics they may not have considered. Results from each iteration of searching as well as the recommended next action(s) for the user to take may be presented in a user interface, and in a way that allows both the results and the user experience to be highly personalized for the user. An LLM may be used to allow the user to provide natural language search goals and also to refine such goals and/or select from the recommended next actions. This allows the system to have a memory of the user's goal history and better personalize both the search results and the suggested action(s).

More particularly, information about prior playbooks and their success rates in various contexts are gathered and processed in an offline job. This information is stored in a database of playbooks. The embedding model may utilize a large language model (LLM), which may itself leverage a generative artificial intelligence (GAI) model, to determine semantically an intent of a user based on the user input. Another machine learning model is then able to determine, given that intent, which playbook in the database of playbooks would be the most useful and recommend one or more filters and/or actions within the determined playbook to the user.

An example of a playbook might be a playbook for a lawnmower salesperson. The playbook may specify filters indicating targeting searches for small business owners in a particular city who are in the landscaping industry. The playbook may also specify other filters indicating targeting searches for homeowners with homes on lots greater than 8000 square feet large with incomes about $60,000. These examples represent two distinct tactics or actions within the playbook.

In an example embodiment, the playbooks are created by an online service. In another example embodiment, the playbooks are community-driven or crowdsourced by having users submit playbooks into a database. In other example embodiments, domain experts may create the playbooks.

An embedding is a representation of a value of a feature in a dimensional space, which allows a system to perform distance-related measurements when comparing two values of features. Essentially the process of embedding involves learning how to convert discrete symbols, such as words, into continuous representations in a dimensional space. For example, a sequence of user profile data (e.g., location, school, skills) can be embedded into a single vector. In this context, vector refers to the computer science version of the term, i.e., an array of values, as opposed to the mathematical version of the term (meaning a line with a direction). The vector of values represents coordinates in an n-dimensional multidimensional space (with n being the number of values in the vector).

Embeddings can be created using machine learning models specifically for the embeddings, or at least specialized layers within other machine learning models. These embedding models/layers therefore rely on extensive training of their own, on top of the training needed for the machine learning model in which the embeddings will be fed as input. As such, in the present disclosure, while the concept of an embedding model is described separately from the concept of a ranking machine learning model, in practice these models may be combined into a single large model.

As mentioned earlier, an LLM may or may not be a GAI model, but in either case it may be used to aid in generating the embeddings. This would eliminate the need for a separately trained embedding model or layer.

GAI refers to a class of artificial intelligence techniques that involves training models to generate new, original data rather than simply making predictions based on existing data. These models learn the underlying patterns and structures in a given dataset and can generate new samples that are similar to the original data.

Some common examples of GAI models include Generative Adversarial Networks (GANs), Variational Autoencoders (VAEs), and autoregressive models. These models have been used in a variety of applications such as image and speech synthesis, music composition, and the creation of virtual environments and characters.

When a GAI model generates new, original data, it goes through the process of evaluating and classifying the data input to it. In an example embodiment, the product of this evaluation and classification is utilized to generate embeddings for data, rather than using the output of the generative AI model directly. Thus, for example, passing the natural language searching goal to a GAI model (or to a fine-tuning layer associated with and/or connected to a GAI model) might ordinarily result in the GAI model creating a new, original goal that is similar to the goal passed to it. In an example embodiment, however, the new, original goal is either not generated or simply discarded. Rather, an embedding for the goal is generated based on the intermediate work product of the GAI model that it would produce when going performing the operations of generating the new, original goal.

More particularly, the GAI model is used to generate content understanding in the form of the embeddings, rather than (or in addition to) generating content itself.

In an example embodiment, the GAI model is implemented as a generative pre-trained transformer (GPT) model or a bidirectional encoder. A GPT model is a type of machine learning model that uses a transformer architecture, which is a type of deep neural network that excels at processing sequential data, such as natural language.

A bidirectional encoder is a type of neural network architecture in which the input sequence is processed in two directions: forward and backward. The forward direction starts at the beginning of the sequence and processes the input one token at a time, while the backward direction starts at the end of the sequence and processes the input in reverse order.

By processing the input sequence in both directions, bidirectional encoders can capture more contextual information and dependencies between words, thereby leading to better performance.

The bidirectional encoder may be implemented as a Bidirectional Long Short-Term Memory (BiLSTM) or BERT (Bidirectional Encoder Representations from Transformers) model. In an example embodiment, a decoder-based model may be utilized, such as an ADA, rather than an encoder-based model such as BiLSTM.

Each direction has its own hidden state, and the final output is a combination of the two hidden states.

Long Short-Term Memories (LSTMs) are a type of recurrent neural network (RNN) designed to overcome the vanishing gradient problem in traditional RNNs, which can make it difficult to learn long-term dependencies in sequential data.

LSTMs include a cell state, which serves as a memory that stores information over time. The cell state is controlled by three gates: the input gate, the forget gate, and the output gate. The input gate determines how much new information is added to the cell state, while the forget gate decides how much old information is discarded. The output gate determines how much of the cell state is used to compute the output. Each gate is controlled by a sigmoid activation function, which outputs a value between 0 and 1 that determines the amount of information that passes through the gate.

In BiLSTM, there is a separate LSTM for the forward direction and the backward direction. At each time step, the forward and backward LSTM cells receive the current input token and the hidden state from the previous time step. The forward LSTM processes the input tokens from left to right, while the backward LSTM processes them from right to left.

The output of each LSTM cell at each time step is a combination of the input token and the previous hidden state, which allows the model to capture both short-term and long-term dependencies between the input tokens.

BERT applies bidirectional training of a model known as a transformer-to-language modelling. This is in contrast to prior art solutions that looked at a text sequence either from left to right or combined left to right and right to left. A bidirectionally trained language model has a deeper sense of language context and flow than single-direction language models.

More specifically, the transformer encoder reads the entire sequence of information at once, and thus is considered to be bidirectional (although one could argue that it is, in reality, non-directional). This characteristic allows the model to learn the context of a piece of information based on all of its surroundings.

In other example embodiments, a GAN embodiment may be used. GAN is a supervised machine learning model that has two sub-models: a generator model that is trained to generate new examples, and a discriminator model that tries to classify examples as either real or generated. The two models are trained together in an adversarial manner (using a zero-sum game, according to game theory), until the discriminator model is fooled roughly half the time, which means that the generator model is generating plausible examples.

The generator model takes a fixed-length random vector as input and generates a sample in the domain in question. The vector is drawn randomly from a Gaussian distribution, and the vector is used to seed the generative process. After training, points in this multidimensional vector space will correspond to points in the problem domain, forming a compressed representation of the data distribution. This vector space is referred to as a latent space or a vector space comprised of latent variables. Latent variables, or hidden variables, are those variables that are important for a domain but are not directly observable.

The discriminator model takes an example from the domain as input (real or generated) and predicts a binary class label of real or fake (generated).

Generative modeling is an unsupervised learning problem, as we discussed in the previous section, although a clever property of the GAN architecture is that the training of the generative model is framed as a supervised learning problem.

The two models, the generator and discriminator, are trained together. The generator generates a batch of samples, and these, along with real examples from the domain, are provided to the discriminator and classified as real or fake.

The discriminator is then updated to get better at discriminating real and fake samples in the next round, and importantly, the generator is updated based on how well the generated samples fooled the discriminator.

In another example embodiment, the GAI model is a VAE model. VAEs comprise an encoder network that compresses the input data into a lower-dimensional representation, called a latent code, and a decoder network that generates new data from the latent code.

In either case, the GAI model contains a generative classifier, which can be implemented as, for example, a naïve Bayes classifier. It is the output of this generative classifier that can be leveraged to obtain embeddings, which can then be used as input to a separately trained machine learning model.

The above generally describes the overall process as used during inference-time (when the ranking machine learning model produces the ranking of playbooks), but the same or similar process of content understanding/embedding can be performed during training of the ranking machine learning model as well. Specifically, for some features of the training data used to train the ranking machine learning model, those features are passed into an embedding model to generate an embedding that provides content understanding for those corresponding features.

The ranking machine learning model may be trained by any model from among many different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In an example embodiment, the ranking machine learning algorithm used to train the machine learning model may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

In some example embodiments, the training of the ranking machine learning model may take place as a dedicated training phase. In other example embodiments, the ranking machine learning model may be retrained dynamically at runtime by the user providing live feedback.

FIG. 1 is a block diagram showing the functional components of a social networking service, including a data processing module referred to herein as a search engine, for use in generating and providing search results for a search query, consistent with some embodiments of the present disclosure.

As shown in FIG. 1, a front end may comprise a user interface module 112, which receives requests from various client computing devices and communicates appropriate responses to the requesting client devices. For example, the user interface module(s) 112 may receive requests in the form of Hypertext Transfer Protocol (HTTP) requests or other web-based Application Program Interface (API) requests. In addition, a user interaction detection module 113 may be provided to detect various interactions that users have with different applications, services, and content presented. As shown in FIG. 1, upon detecting a particular interaction, the user interaction detection module 113 logs the interaction, including the type of interaction and any metadata relating to the interaction, in a user activity and behavior database 122.

An application logic layer may include one or more various application server modules 114, which, in conjunction with the user interface module(s) 112, generate various user interfaces (e.g., web pages) with data retrieved from various data sources in a data layer. In some embodiments, individual application server modules 114 are used to implement the functionality associated with various applications and/or services provided by the social networking service.

As shown in FIG. 1, the data layer may include several databases, such as a profile database 118 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 118. Similarly, when a representative of an organization initially registers the organization with the social networking service, the representative may be prompted to provide certain information about the organization. This information may be stored, for example, in the profile database 118 or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 120.

As users interact with the various applications, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 1, by the user activity and behavior database 122. This logged activity information may then be used by a search engine 116 to determine search results for a search query.

Furthermore, one or more playbooks may be stored in a playbook database 124.

Although not shown, in some embodiments, a social networking system 110 provides an API module via which applications and services can access various data and services provided or maintained by the social networking service. For example, using an API, an application may be able to request and/or receive one or more recommendations. Such applications may be browser-based applications or may be operating system-specific. In particular, some applications may reside and execute (at least partially) on one or more mobile devices (e.g., phone or tablet computing devices) with a mobile operating system. Furthermore, while in many cases the applications or services that leverage the API may be applications and services that are developed and maintained by the entity operating the social networking service, nothing other than data privacy concerns prevents the API from being provided to the public or to certain third parties under special arrangements, thereby making the navigation recommendations available to third-party applications and services.

Although the search engine 116 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 116 facilitates the indexing and searching for content within the social networking service, such as the indexing and searching for data or information contained in the data layer, such as profile data (stored, e.g., in the profile database 118), social graph data (stored, e.g., in the social graph database 120), and user activity and behavior data (stored, e.g., in the user activity and behavior database 122). The search engine 116 may collect, parse, and/or store data in an index or other similar structure to facilitate the identification and retrieval of information in response to received queries for information. This may include, but is not limited to, forward search indexes, inverted indexes, N-gram indexes, and so on.

Additionally, a playbook database 124 stores one or more playbooks describing a collection of specific filter criteria that is believed to work well in various contexts.

Figure 2:
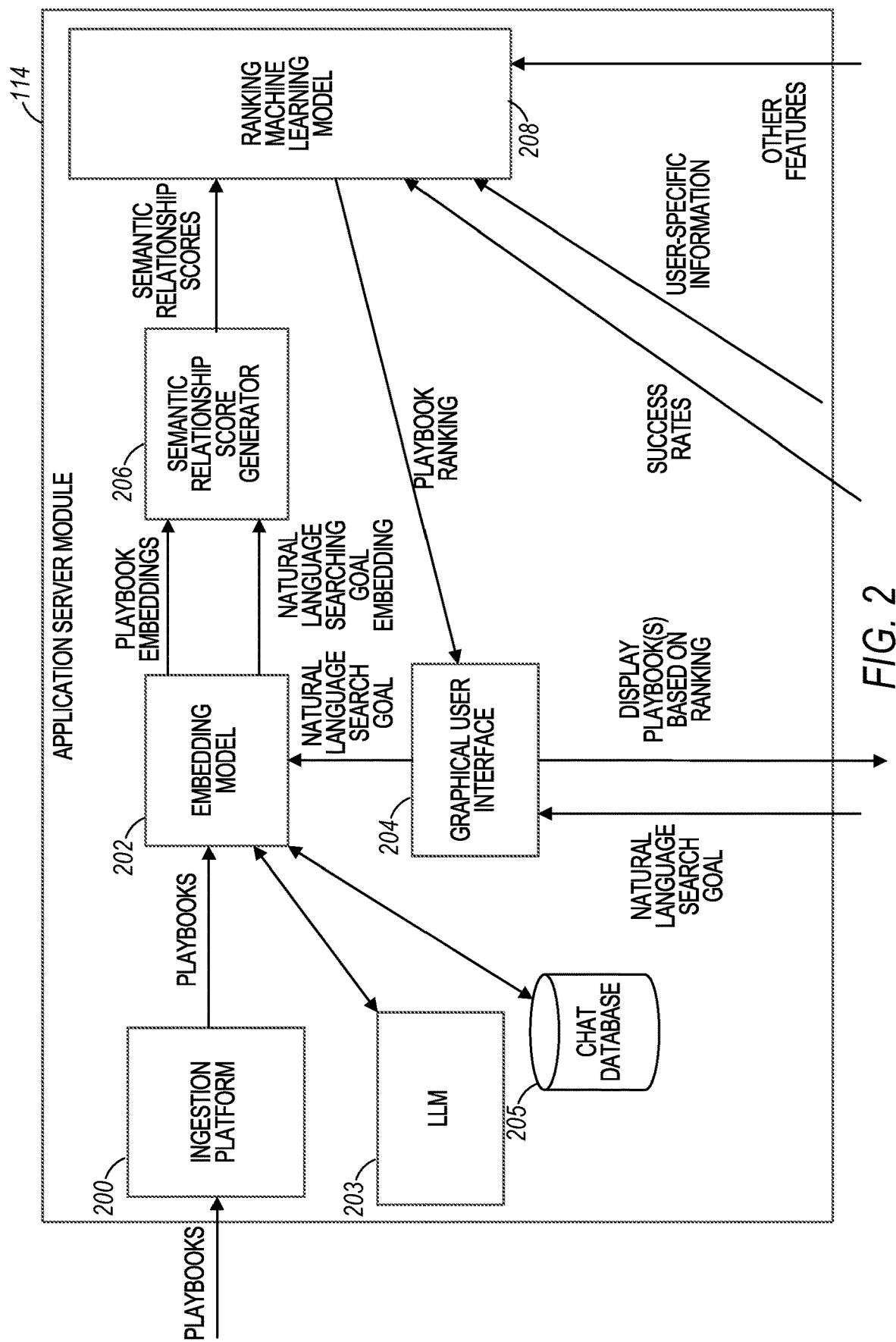
FIG. 2 is a block diagram illustrating the application server module of FIG. 1 in more detail, in accordance with an example embodiment.

FIG. 2 is a block diagram illustrating the application server module 114 of FIG. 1 in more detail, in accordance with an example embodiment. While in many embodiments the application server module 114 will contain many subcomponents used to perform various actions within the social networking system 110, only those components that are relevant to the present disclosure are depicted in FIG. 2.

Here, an ingestion platform 200 obtains playbooks from the playbook database 124 in an offline manner. These playbooks are then passed to an embedding model 202 to obtain an embedding indicative of a meaning of the playbook for each playbook. At runtime, a user may interact with a graphical user interface 204 to input a natural language searching goal. This natural language searching goal can then be passed to the embedding model 202 to generate an embedding for the natural language search goal, representing a user intent of the user. In some example embodiments, the embedding model 202 may utilize additional information about the user, as gathered from, for example, the profile database 118, social graph database 120, and/or the user activity and behavior database 122, in producing this embedding. For example, the embedding may take into account characteristics of the user (such as the user's region of residence) in producing the embedding, conceivably producing a different embedding based on the user living in New York versus the same user living in California.

Also, in some example embodiments, the embedding model 202 may utilize an LLM 203 to aid in producing the embedding. The LLM 203 may have the ability to retain a recent chat history and produce results that are at least partially based on this recent chat history (e.g., a request made by a user earlier in a session may be used as context for a result produced by the LLM 203 later in that same session). Additionally, for further contextual information, a chat database 205 may be maintained that contains older chats (e.g., beyond the current session) that can be utilized by the embedding model as well 202, either directly or as further input to the LLM 203.

A semantic relationship score generator 206 may then utilize the embeddings (of both the natural language searching goal and of the multiple playbooks) to produce a semantic relationship score for each combination of natural language searching goal and playbook. This semantic relationship score is representative of a semantic similarity between a natural language searching goal and the corresponding playbook.

It should be noted that while in some example embodiments the semantic relationship score generator 206 may include or be a machine learning model, it is not strictly necessary for that to be so. Specifically, if the embeddings produced by the embedding model 202 indeed reflect similarity between items that have been embedded, then a function such as a cosine distance function can be performed on the embeddings to identify the embedding combinations having the smallest cosine distance between them without needing to use a machine learning model for this aspect.

The semantic relationship scores can then be passed as features to a ranking machine learning model 208, which produces a ranking of the playbooks. The ranking machine learning model 208 may utilize other features as well, such as success rate (possibly obtained from the user activity and behavior database 122) and/or user-specific information (such as obtained from the profile database 118, social graph database 120, and/or the user activity and behavior database 122).

The graphical user interface 204 then displays a set of filters and actions corresponding to at least one of the playbooks, based on the ranking. For example, the graphical user interface 204 may display the top n actions from the ranking.

"Success rate" is a measured rate based on a definition of "success" that may vary based on context. In simplest terms, a "success" is simply whatever (at least partially) the ranking machine learning model 208 has been designed to optimize for. In one context, success means that the user gets a sale (such as where the user is a salesperson). In another context, success means that the user receives a response to a communication sent by the user. In another context, success means an acceptance of a request to connect in a social networking service. Whatever the meaning of "success" in the particular context, "success rate" is the rate of executions that were successful to the number of total executions. Thus, for example, if success is defined as a response to a communication sent by a user to try to establish a new client relationship, then success rate in this context would be the number of times the user received a response to a communication sent by the user to try and establish a new client relationship divided by the total number of times the user sent a communication to try and establish a new client relationship.

The ranking machine learning model 208 may be trained using success rate as an objective on which to optimize. This can, however, lead to suboptimal results in certain circumstances. For example, there may be some newer playbooks or actions within playbooks that do not yet have result data in order to measure success rate, such as if a new action of "sending an invitation to connect to a new message broker topic" has recently been added to a playbook and such an invitation has not yet been sent out (either by this particular user or by any other similar user). This can lead to a negative feedback loop where the user is unaware of that action as a possible action to perform, and because of users' unawareness of that possibility, the action is never presented to a user as a possible action to perform, essentially eternally keeping users in the dark as to the availability of this new, and potentially useful, action. To remedy this problem, actions and/or playbooks without measured success rates are occasionally inserted into the ranking by the ranking machine learning model 208. This may be performed either using a simple process, such as randomly inserting such actions and/or playbooks without measured success rates into the ranking on a periodical basis, or using a more complex process, such as building the ranking machine learning model 208 to optimize over multiple objectives, one of which being success rate but the other being diversity in recommendations (e.g., how often different types of recommendations are made).

In an example embodiment, the ranking machine learning model 208 is trained to optimize over multiple objectives by utilizing a two-tower neural network machine learning model. Two-tower embeddings utilize a single neural network that combines two neural networks working in parallel. The output of the combination neural network is a dot product of the outputs of the two individual neural networks.

More particularly, in a two-tower network, a first neural network contains an embedding layer and hidden layer, and a second neural network contains an embedding layer and a hidden layer. Given feature vectors, the two towers provide embedding functions that encode the features to a k-dimensional embedding space. This is performed by optimizing both towers towards a single goal.

Furthermore, in an example embodiment, the ranking machine learning model 208 and/or the embedding model 202 are retrained using feedback from users. More particularly, the user selections of which actions within which playbooks to execute can then be fed back into a training process to retrain the embedding model 202 and/or ranking machine learning model 208 to account for the user's selections (or, as negative samples, the actions and/or playbooks the user did not select).

It should be noted that while FIG. 2 depicts various components executing on an application server module, some of these components may, in some example embodiments, be located on a client device rather than an application server module 114. For example, the embedding model 202 and/or the ranking machine learning model 208 may be located on the client device, while still performing the same or similar operations as when they are included in the application server module 114.

Figure 3:
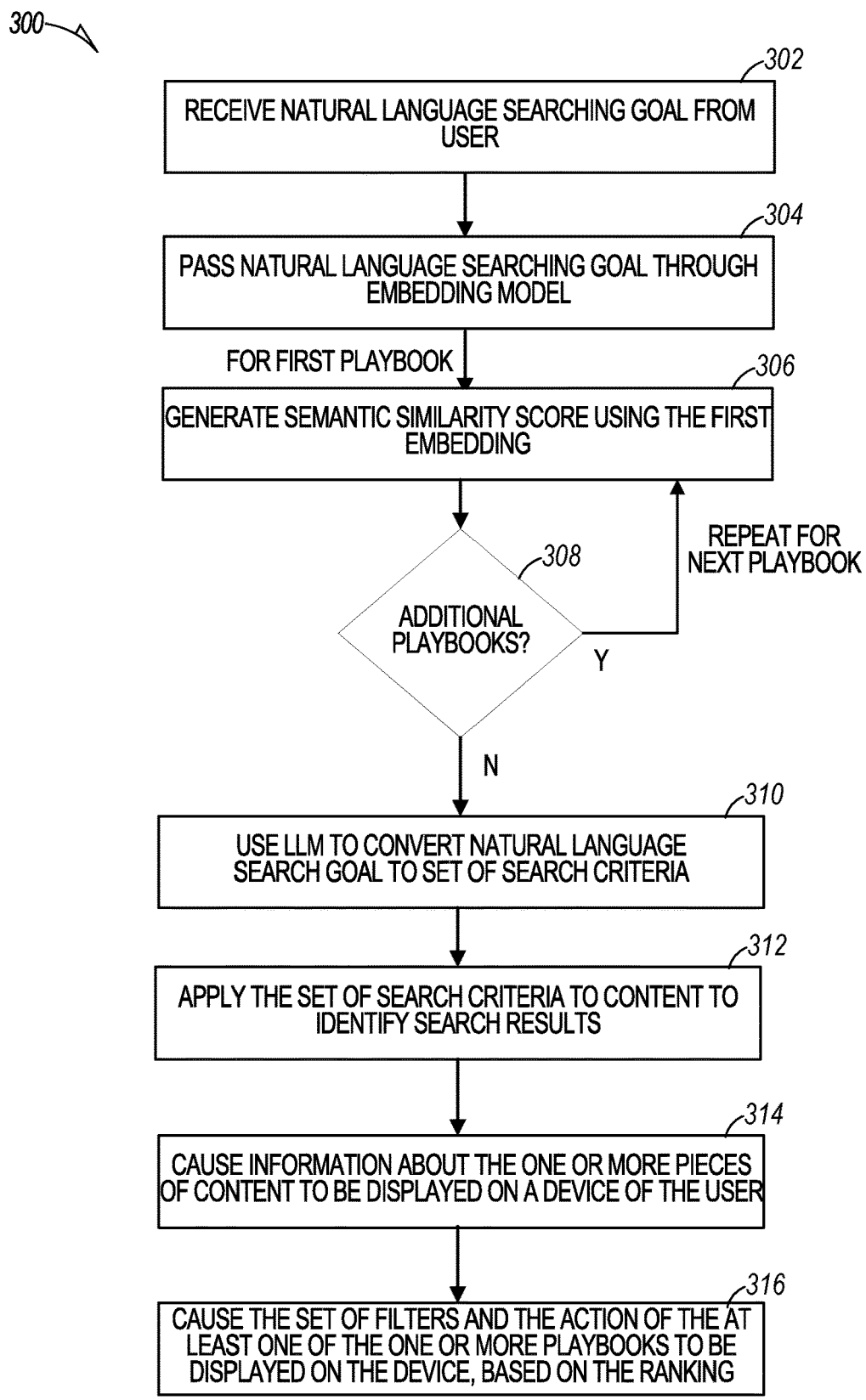
FIG. 3 is a flow diagram illustrating a method of using machine learning to provide a ranking of playbooks, in accordance with an example embodiment.

FIG. 3 is a flow diagram illustrating a method 300 of using machine learning to provide a ranking of playbooks, in accordance with an example embodiment. At operation 302, a natural language searching goal is received from a user. At operation 304, the natural language searching goal is passed through an embedding model to produce a first embedding representing an intent of the user.

Then a loop is begun for each of one or more playbooks. These playbooks may be stored in a playbook database, with each playbook containing a set of filters, an action, and a success rate.

At operation 306, a semantic similarity score representative of a semantic similarity between the natural language searching goal and a corresponding playbook is generated, using the first embedding. At operation 308, it is determined if there are any more playbooks. If so, then the method 300 loops back to operation 306 for the next playbook. If not, then the method 300 proceeds to operation 310.

At operation 310, an LLM is used to convert the natural language searching goal to a set of search criteria. Thus, for example, a natural language searching goal of "I would like to see resumes of people with experience in Java programming" may be converted to a set of search criteria such as "users with more than 5 years experience", "users with Computer Science degrees", "users in the United States", and "users with a Java skill rating of 5 or higher." At operation 312, the set of search criteria is applied to a set of content to identify a set of search results meeting the set of search criteria. At operation 314, information about one or more pieces of content from the set of search results is caused to be displayed to the user.

At operation 316, based on the ranking, the set of filters and the action of the at least one of the one or more playbooks are caused to be displayed on a device of the user.

Figure 4:
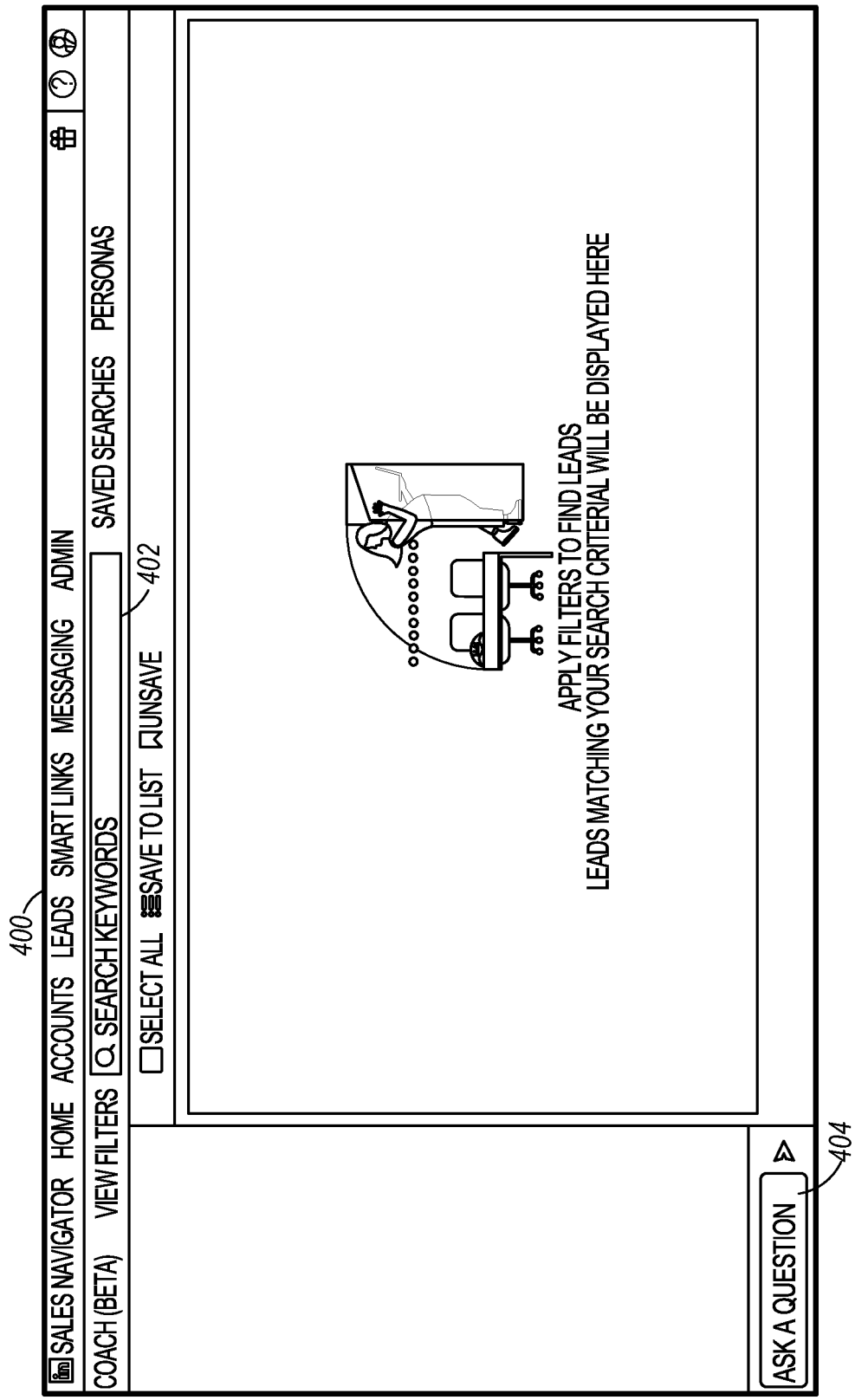
Figure 5:
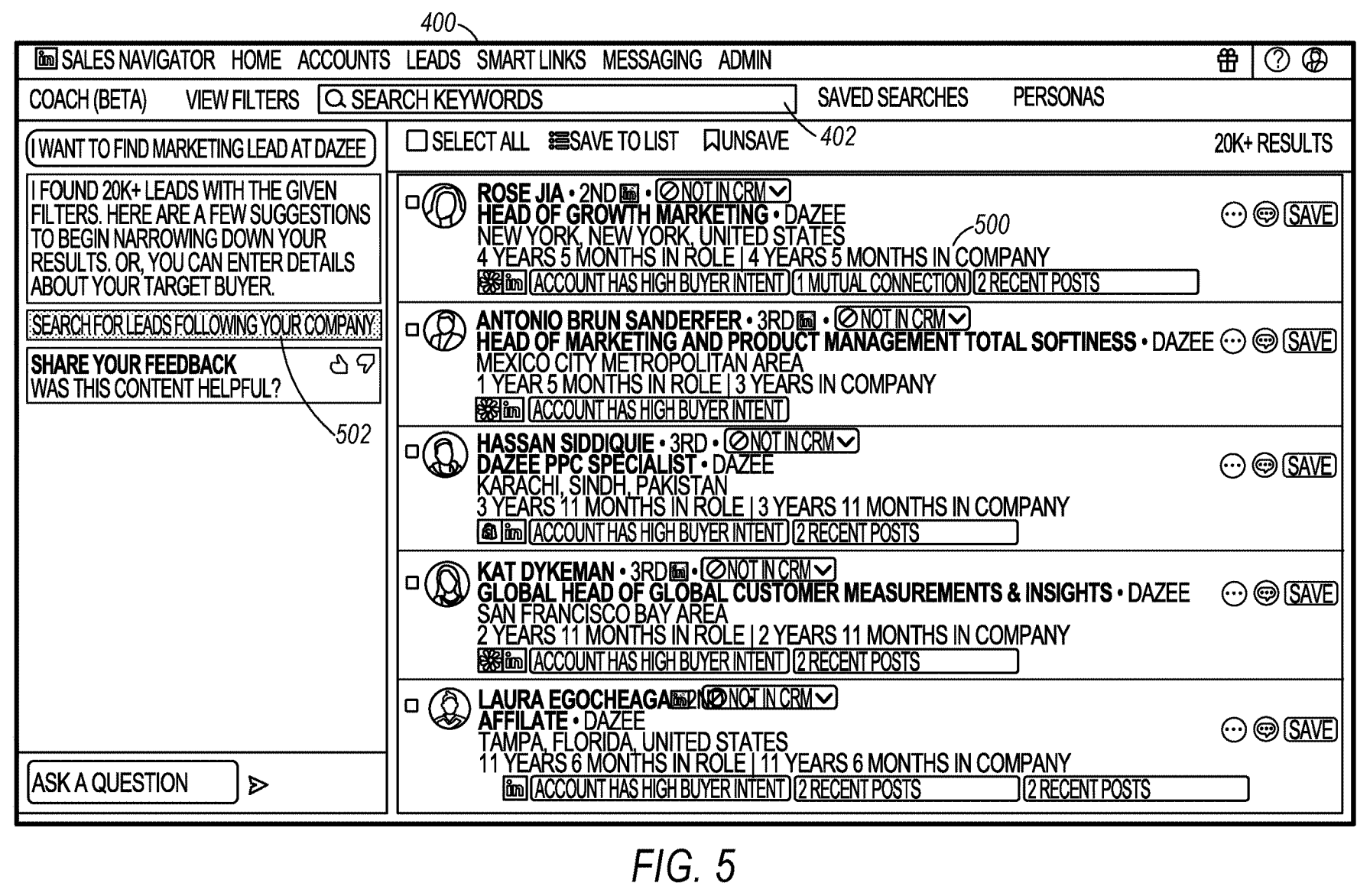
Figure 6:
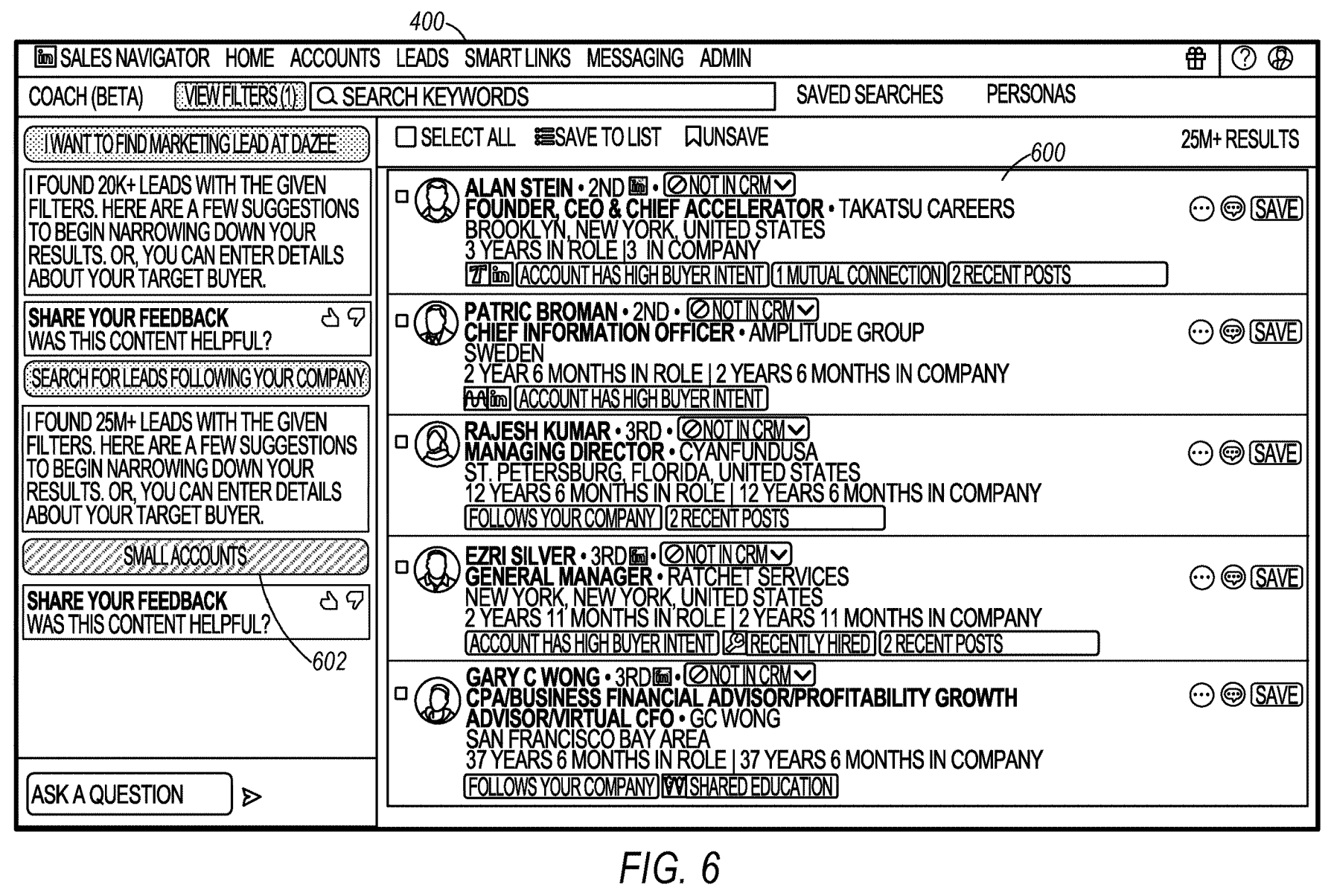

FIGS. 4-6 are diagrams illustrating a user interface, in accordance with an example embodiment. It should be noted that this is merely an example user interface and it is not intended to limiting. Referring first to FIG. 4, user interface 400 is provided to allow users to search for "sales leads". A traditional search using existing technology may be initiated by typing one or more keywords into a keyword text field 402. A separate natural language text field 404 is provided that allows a user to type a natural language searching goal.

One the user types a natural language searching goal into natural language text field 404, the natural language searching goal is passed through an embedding model to produce an embedding representing an intent of the user. This embedding, as described earlier, is used to rank one or more playbooks and then display an action of at least one of the ranked playbooks. Also the natural language searching goal is converted into a set of filters used to filter one or more search results for display.

FIG. 5 depicts the user interface 400 after the user has typed a natural language searching goal into natural language text field 404 and an action has been recommended. Specifically, the user has specified that the natural language searching goal is "I want to find marketing lead at ABC, Inc.". From this, a set of filters has been generated and used to filter search results, producing a series of displayed search results 500. Notably, these displayed search results 500 are those search results that best fit the generated filters. All, for example, are marketing leads at ABC, Inc.

The natural language searching goal is also used to generate a recommended action 502. Here recommended action 502 is to "Search for leads following your company". In this example embodiment, the user can select on the recommended action 502 itself to have the system execute the recommended action. Thus, in this case, the user selects recommended action 502, which then results in the system searching for leads following the user's company.

FIG. 6 depicts the user interface 400 after the user has selected recommended action 502. Here, new search results 600 are presented based on the selected recommended action 502. Also notably is that an additional recommended action 602 is also presented at this stage, which the user can select to generate additional search results. This may continue indefinitely, which a new recommended action being presented each time the user selects on an earlier recommended action.

Figure 7:
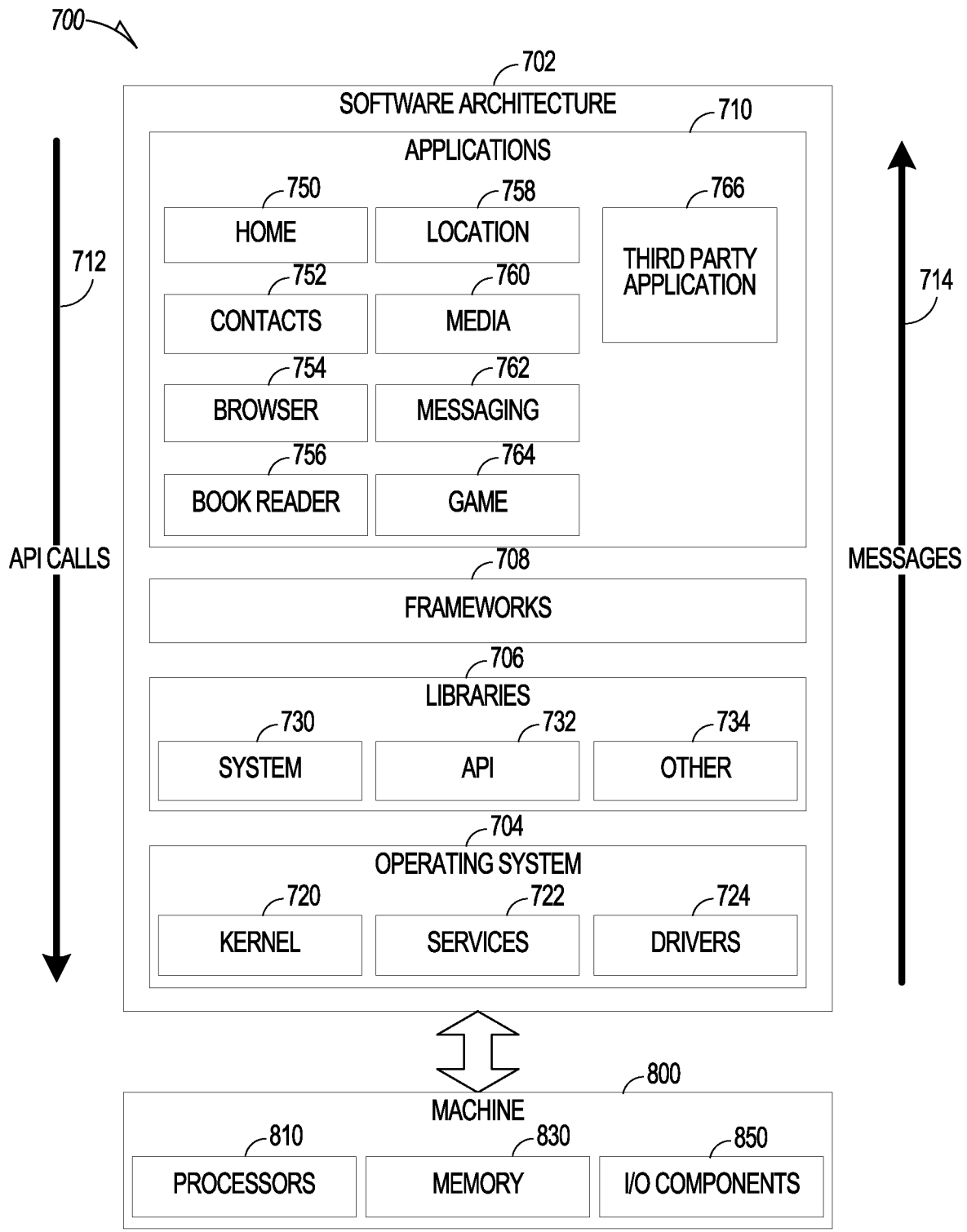
FIG. 7 is a block diagram illustrating a software architecture, in accordance with an example embodiment.

FIG. 7 is a block diagram 700 illustrating a software architecture 702, which can be installed on any one or more of the devices described above. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example architecture, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke API calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionalities. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphical user interface functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
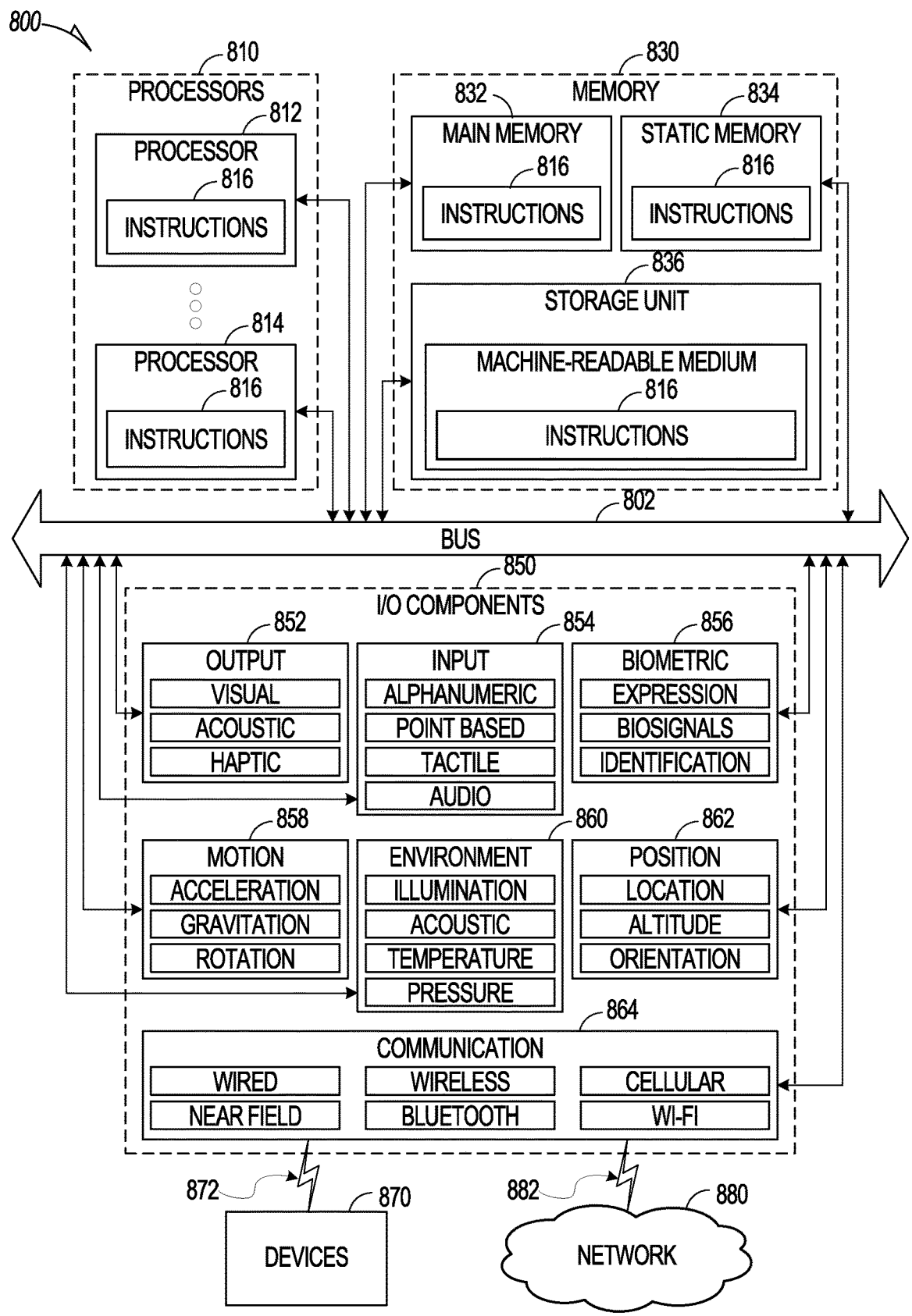
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application 710, an applet, an app, or other executable code) for causing the machine 800 to perform any one or more of the methodologies discussed herein may be executed. For example, the instructions 816 may cause the machine 800 to execute the method 300 of FIG. 3. Additionally, or alternatively, the instructions 816 may implement FIGS. 1-6, and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors 812 (sometimes referred to as "cores") that may execute instructions 816 contemporaneously. Although FIG. 8 shows multiple processors 810, the machine 800 may include a single processor 812 with a single core, a single processor 812 with multiple cores (e.g., a multi-core processor), multiple processors 810 with a single core, multiple processors 810 with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine 800 will depend on the type of machine 800. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photooptical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 816 and/or data. The terms shall accordingly be taken to include, but not be limited to, solid-state memories, and optical and magnetic media, including memory internal or external to the processors 810. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 880 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 816 may be transmitted or received over the network 880 using a transmission medium via a network interface device (e.g., a network interface component included in the communication components 864) and utilizing any one of several well-known transfer protocols (e.g., HTTP). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one processor;
   a non-transitory computer-readable medium having instructions stored thereon, which, when executed by the at least one processor, cause the system to perform operations comprising:
   receiving a natural language searching goal from a device of a user;
   passing the natural language searching goal through an embedding model to produce an embedding representing an intent of the user;
   for each of one or more playbooks, generating a semantic similarity score, representative of a semantic similarity between the natural language searching goal and a corresponding playbook, using the embedding, each playbook containing a set of filters, an action, and a success rate;
   passing the corresponding success rate and the semantic similarity score for each of the one or more playbooks to a ranking machine learning model that produces a ranking of the one or more playbooks; and
   based on the ranking, causing display of the action of the at least one of the one or more playbooks on a device of the user.

2. The system of claim 1, wherein the operations further comprise:
   receiving, from the device of the user, a selection of the action;
   in response to the receiving the selection, applying the set of filters associated with the action to a set of content to identify a set of search results; and
   causing display of information about one or more pieces of content from the set of search results to the user.

3. The system of claim 1, wherein the semantic similarity score for each of the one or more playbooks is generated using a separate embedding produced for each of the one or more playbooks.

4. The system of claim 3, wherein the separate embedding is produced by passing a corresponding playbook through the embedding model.

5. The system of claim 4, wherein the separate embedding for each of the one or more playbooks is generated in an offline manner prior to the receiving of the natural language searching goal from the user.

6. The system of claim 1, wherein the success rate for a particular playbook is based specifically on success of the particular playbook for the user.

7. The system of claim 1, wherein the success rate for a particular playbook is based on success of the particular playbook for users similar to the user.

8. The system of claim 1, wherein the success rate of a particular playbook is a rate of successful executions of the particular playbook divided by a total number of executions of the particular playbook.

9. The system of claim 8, wherein a successful execution is an execution in which a specified goal for the user is achieved.

10. The system of claim 9, wherein the specified goal is one of:
    a sale;
    a response to a communication; or
    an acceptance of a request to connect in a social networking service.

11. The system of claim 1, wherein the ranking machine learning model further takes as input a history of behavior of the user in an online service.

12. The system of claim 1, wherein the ranking machine learning model periodically inserts a playbook lacking a measured success rate into the ranking.

13. The system of claim 12, wherein the ranking machine learning model is a multi-objective machine learning model trained to optimize multiple objectives, the multiple objectives comprising the success rate and a diversity in playbook recommendations.

14. The system of claim 1, wherein the embedding model utilizes a large language model (LLM).

15. The system of claim 14, wherein the operations further comprise:
    using the LLM to convert the natural language searching goal to a set of search criteria;
    applying the set of search criteria to a set of content to identify a set of search results meeting the set of search criteria; and
    causing display of information about one or more pieces of content from the set of search results to the user prior to the causing display of the set of filters and action corresponding to at least one of the one or more playbooks to the user.

16. The system of claim 1, wherein each embedding is a set of coordinates in a multidimensional space, wherein distance between sets of coordinates in the multidimensional space is related to semantic similarity of data represented by the sets of coordinates.

17. A method comprising:
    receiving a natural language searching goal from a device of a user;
    passing the natural language searching goal through an embedding model to produce an embedding representing an intent of the user;

for each of one or more playbooks, generating a semantic similarity score, representative of a semantic similarity between the natural language searching goal and a corresponding playbook, using the embedding, each playbook containing a set of filters, an action, and a success rate;

passing the corresponding success rate and the semantic similarity score for each of the one or more playbooks to a ranking machine learning model that produces a ranking of the one or more playbooks; and based on the ranking, causing display of the action of the at least one of the one or more playbooks on a device of the user.

18. The method of claim 17, wherein the semantic similarity score for each of the one or more playbooks is further generated using a separate embedding produced for each of the one or more playbooks.

19. A non-transitory machine-readable medium storing instructions which, when executed by one or more processors, cause the one or more processors to perform operations comprising:

receiving a natural language searching goal from a device of a user;

passing the natural language searching goal through an embedding model to produce an embedding representing an intent of the user;

for each of one or more playbooks, generating a semantic similarity score, representative of a semantic similarity between the natural language searching goal and a corresponding playbook, using the embedding, each playbook containing a set of filters, an action, and a success rate;

passing the corresponding success rate and the semantic similarity score for each of the one or more playbooks to a ranking machine learning model that produces a ranking of the one or more playbooks; and based on the ranking, causing display of the action of the at least one of the one or more playbooks on a device of the user.

20. The non-transitory machine-readable medium of claim 19, wherein the embedding model utilizes a large language model (LLM).

* * * * *